(12) United States Patent
Markert

(10) Patent No.: US 10,493,809 B2
(45) Date of Patent: Dec. 3, 2019

(54) ANTENNA FOR A RECEIVER OR TRANSMITTER IN A MOTOR VEHICLE, IN PARTICULAR FOR A TIRE-STATUS MONITORING SYSTEM

(71) Applicant: ALLIGATOR VENTILFABRIK GMBH, Giengen (DE)

(72) Inventor: Christian Markert, Herbrechtingen (DE)

(73) Assignee: ALLIGATOR VENTILFABRIK GMBH, Giengen (DE)

( * ) Notice: Subject to any disclaimer, the term of this patent is extended or adjusted under 35 U.S.C. 154(b) by 189 days.

(21) Appl. No.: 15/323,912

(22) PCT Filed: Jul. 8, 2015

(86) PCT No.: PCT/EP2015/065560
§ 371 (c)(1),
(2) Date: Jul. 13, 2017

(87) PCT Pub. No.: WO2016/015962
PCT Pub. Date: Feb. 4, 2016

(65) Prior Publication Data
US 2017/0313140 A1     Nov. 2, 2017

(30) Foreign Application Priority Data

Jul. 30, 2014  (DE) .................. 10 2014 214 928

(51) Int. Cl.
*H01Q 7/00* (2006.01)
*B60C 23/04* (2006.01)
*H01Q 1/22* (2006.01)

(52) U.S. Cl.
CPC ....... *B60C 23/0444* (2013.01); *H01Q 1/2241* (2013.01); *H01Q 7/00* (2013.01)

(58) Field of Classification Search
CPC ..... H01Q 7/00; H01Q 1/2241; B60C 23/0444
See application file for complete search history.

(56) References Cited

U.S. PATENT DOCUMENTS 6,150,984 A * 11/2000 Suguro .................. H01Q 1/242
                                                    343/700 MS
7,352,277 B2    4/2008 Sato
(Continued)

FOREIGN PATENT DOCUMENTS

DE    10 2005 007 325       9/2005
DE    10 2013 211 541       12/2013
(Continued)

OTHER PUBLICATIONS

International Search Report and Written Opinion dated Sep. 15, 2015 in PCT/EP2015/065560.

(Continued)

*Primary Examiner* — Dieu Hien T Duong
(74) *Attorney, Agent, or Firm* — Faegre Baker Daniels LLP

(57) ABSTRACT

The invention relates to an antenna for a receiver or transmitter in a motor vehicle, comprising an electrically conductive loop, which surrounds an area for the passage of electromagnetic waves, which interact with an electric current flow through the loop. The loop has a connection side, via which an electric current can be introduced into the loop or drawn from the loop inductively or by means at least one electrical connection. The antenna according to the invention is characterized in that the area surrounded by the loop is twisted over a twist axis that is perpendicular to or at an angle to the connection side.

21 Claims, 3 Drawing Sheets

(56) References Cited

U.S. PATENT DOCUMENTS

| 2001/0045916 | A1* | 11/2001 | Noro | H01Q 1/362 |
| | | | | 343/895 |
| 2006/0055618 | A1* | 3/2006 | Poilasne | H01Q 1/241 |
| | | | | 343/866 |
| 2007/0013503 | A1* | 1/2007 | Chien | B60C 23/0408 |
| | | | | 340/447 |
| 2008/0136738 | A1 | 6/2008 | Leisten | |

FOREIGN PATENT DOCUMENTS

| JP | 2004-345364 | 12/2004 |
| JP | 2011-188365 | 9/2011 |

OTHER PUBLICATIONS

International Report on Patentability dated Jun. 28, 2016 in PCT/EP2015/065560.

* cited by examiner

ANTENNA FOR A RECEIVER OR TRANSMITTER IN A MOTOR VEHICLE, IN PARTICULAR FOR A TIRE-STATUS MONITORING SYSTEM

RELATED APPLICATIONS

The present application is a national phase filing under 35 U.S.C. § 371 of International Application No. PCT/EP2015/065560, filed on Jul. 8, 2015, which claims the benefit of priority to German Patent Application No. 10 2014 214 928.2, filed on Jul. 30, 2014.

The present invention relates to an antenna for a receiver or transmitter in a motor vehicle, in particular for a tyre status monitoring system, which is adapted for example to record the air pressure and/or the temperature and/or other state variables, for example the direction of rotation or rotational speed (number of revolutions per unit time) in a tyre.

Tyre status monitoring systems, in particular tyre pressure monitoring systems, are known in a plurality of embodiments. These make it possible to monitor a status, for example, the pressure or the temperature in the tyre by means of a sensor positioned in or on a tyre, which records the desired state variable, for example the air pressure of the tyre and transmits it by means of a connected or integrated transmitter to a receiving device outside the tyre in the vehicle. The receiving device can relay the transmitted data or evaluate it itself so that undesirable states of the tyre, for example a too-low tyre air pressure can be recorded, and corresponding measures, in particular warnings can be performed or produced.

For smooth communication between the central receiving device or receiving device positioned in a distributed manner in the vehicle and the sensor or sensors in the tyres, it is necessary that the signals transmitted by the transmitter in the tyre are reliably recorded by the receiving device. For this the receiving device has at least one antenna which records the signals from the tyre or tyres. If the central or decentralized receiving device is also to transmit signals to the sensor or sensors or the appurtenant control device in the tyres, in addition to the receiver, it has a transmitter which uses the same antenna or an additional antenna for signal transmission. Furthermore, additional antennae can be provided, with which the receiving device communicates, for example, with monitoring devices or central systems positioned in the vehicle or outside the vehicle.

The antenna of the receiver or transmitter in the receiving device or also at the other end of the communication connection in or on the tyre can in principle be designed in various known antenna forms such as a rod antenna, wound coil or in the form of a loop. The present invention however only relates to antennae in loop form which respond to magnetic fields or generate primarily magnetic fields. In such an antenna with an electrically conductive loop, an area is provided for passage of electromagnetic waves which interact with an electric current flow through the loop. The loop has a connection side for signal transmission via which an electric current can be introduced into the loop or drawn from the loop inductively or by means of at least one electrical connection.

In conventional antennae with such an electric loop, the loop is positioned inside or on a printed circuit board parallel to this, which on the one hand is favourable in regard to the necessary installation space of the receiver or transmitter and on the other hand enables easy manufacture. Furthermore, the electrically conductive loop is protected from damage. However in practice corresponding transmitters or receivers are frequently mounted near or on a vehicle frame which consists of metal. This vehicle frame naturally has an effect on the electromagnetic waves received by the loop, which can lead to interference or poor receiving or transmission behaviour.

Known from JP 2004 345 364 A is a tyre monitoring system for a vehicle in which an antenna connected to a monitoring unit receives the radio waves from sensors located in the tyres, wherein a multiplicity of possible antennae to be used is described, including an electrically conductive rectangular loop antenna which is provided on one side with adapting elements or connections.

Known from DE 10 2005 007 325 A1 is an antenna for a tyre pressure transmitting device mounted in the wheel rim. The tyre pressure transmitting device has a transmission circuit and an antenna, wherein the antenna has an emission electrode or loop which encloses the loop area.

US 2008/0136738 A1 describes a multifilar helix antenna comprising helical elements wound around a cylinder as well as feed elements and connecting elements which enclose the cylinder, wherein the electrical length of the antenna is an odd multiple of the half-wavelength.

In principle, in the area of communications technology, antennae are also known in which the electrical loop runs in a plane which is perpendicular to the plane of the printed circuit board.

It is therefore the object of the present invention to provide an antenna for a receiver or a transmitter in a motor vehicle, in particular for a tyre status monitoring system, which allows particularly secure and interference-free communication between the communication partners involved, such as for example the central or decentralized receiving device in the vehicle and the sensor or sensors in the tyres.

The object according to the invention is solved by an antenna having the features of claim 1. Particularly advantageous embodiments of the invention are specified in the dependent claims.

An antenna according to the invention for a receiver or transmitter in a motor vehicle, in particular for a tyre status monitoring system, for example tyre pressure monitoring system, generically comprises an electrically conductive loop which surrounds an area for passage of electromagnetic waves which interact with an electric current flow through the loop. The loop has a connection side via which an electric current can be introduced into the loop or drawn from the loop inductively or by means of at least one electrical connection. It is thus possible to transmit or receive with the loop via the introduction or drawing out.

According to the invention, the area surrounded by the loop is now twisted over a twist axis which is perpendicular to or at an angle to the connection side. This means that the loop is no longer positioned within a plane, for example the printed circuit board plane. By this means it is possible to achieve an extensive directional independence with regard to the transmission or receiving behaviour. Thus, electromagnetic waves now run through the area enclosed by the loop when these electromagnetic waves are aligned in their direction parallel to the connection side of the loop.

It is furthermore possible to set up the loop on the printed circuit board plane so that a printed circuit board mounted on a vehicle frame made of metal does not result in inferior transmission or receiving behaviour of the loop. It is particularly favourable for this purpose if the loop is connected electrically conductively or inductively with its connection side to the printed circuit board or an electronic component provided thereon, wherein the twist axis and the loop are perpendicular to or at an angle to a base surface of the printed circuit board.

According to a particularly advantageous embodiment, the printed circuit board or an electronic component provided thereon forms an electrically conductive coupling loop which is inductively coupled to the loop set up on the printed circuit board and the connection side of the loop and a coupling side of the coupling loop assigned thereto run equidistantly, in particular parallel to one another.

According to one embodiment of the invention, the connection side of the loop is formed by a straight line, a singly or multiply angled line or a curve and the loop has a side opposite the connection side which is also formed by a straight line, a singly or multiply angled line or a curve, wherein the connection side and the opposite side run within two planes parallel to one another or plane-parallel planes.

It is favourable if the antenna comprises a base body which in particular has an at least substantially cylindrical or frustroconical shape at least over a part of its circumference and the loop is mounted on the outer surface of the base body. The base body can, for example, be designed as a hollow body, which encloses an interior. According to one embodiment, the base body is open to the interior at least on one side and this open side has a web running diagonally through the opening, which carries a section, in particular a (complete) side of the loop, advantageously its connection side.

According to one embodiment of the invention, the loop is interrupted over its circumference once or multiple times, in particular precisely twice, wherein the interruption is advantageously provided outside the connection side. The at least one interruption or all the interruptions can be bridged by means of in each case at least one electrical resistance and/or by means of in each case at least one capacitor. Particularly favourably the at least one interruption can form an interdigital capacitor. A bridging of the interruption by means of an inductance by corresponding windings or coils on both side of the interruption is also possible.

A tuning of the antenna is possible by means of the interruption and the bridging thereof.

One embodiment of the invention provides that an additional antenna is mounted on the base body on which the loop is mounted, which is electrically connected to the loop or electrically insulated from this. The at least one additional antenna can but need not be designed in a different form to a loop antenna, for example as a rod antenna or fractal antenna.

The loop and in particular the at least one additional antenna can be mounted by laser direct structuring on the base body. This is particularly advantageous when the base body according to one embodiment which can also be provided independently of this laser direct structuring, is made of plastic.

A receiver according to the invention, in particular of a tyre status monitoring system is characterized in that it has an antenna according to the invention of the type described here. Furthermore, a tyre status monitoring system according to the invention is characterized by an antenna according to the invention, in particular a transmitter and/or a receiver having an antenna according to the invention and in particular is designed as a tyre pressure monitoring system in order to monitor the pressure in one or a plurality of vehicle tyres. Usually at least one tyre status sensor, in particular a tyre pressure sensor is further provided which is in communication connection with the antenna of the receiver and/or transmitter and/or can be switched into such a connection.

The invention will be described in exemplary fashion hereinafter with reference to an exemplary embodiment and the figures.

Figure 1:
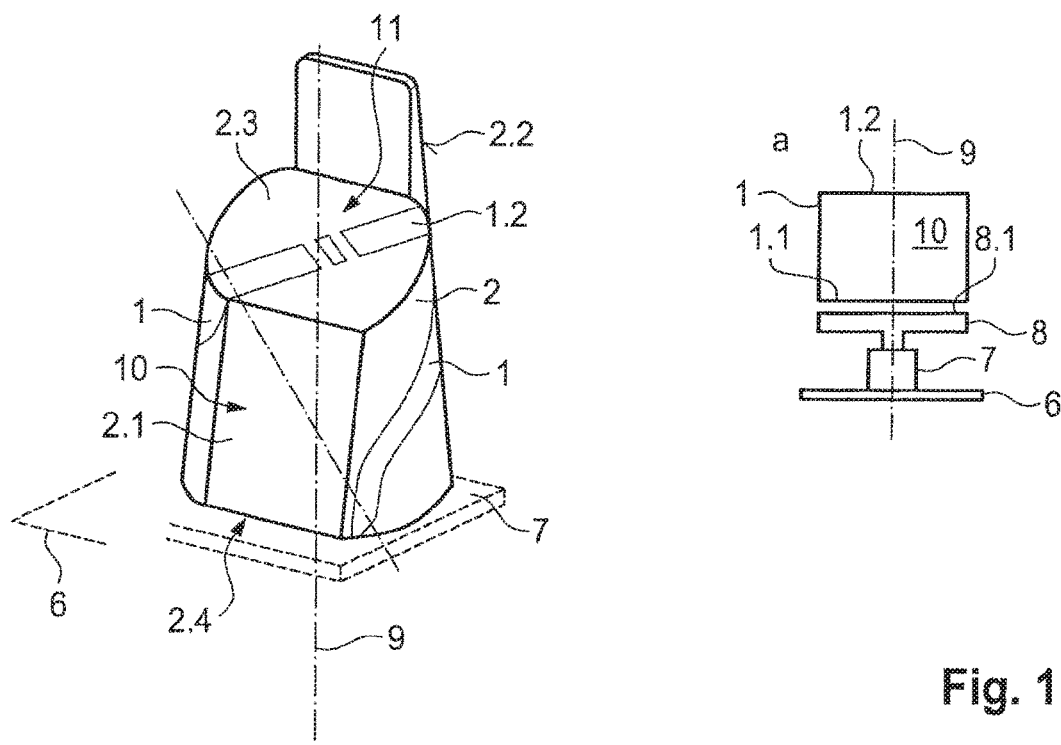
FIG. 1 shows a three-dimensional plan view of an exemplary embodiment of an antenna according to the invention.

FIG. 1 shows an antenna designed according to the invention for a receiver or transmitter in a motor vehicle, here for a tyre status monitoring system. The antenna has an electrically conductive loop 1 which in the exemplary embodiment shown is mounted on a base body 2, which for example is made of plastic. The base body 2 has a substantially cylindrical shape where two flattened sides 2.1 and 2.2 facing away from one another are provided over the outer circumference thereof. In the present case, the flattened side 2.1 is designated as front side and the flattened side 2.2 is designated as rear side. Furthermore the base body 2 has an upper end face 2.3 and a lower end face 2.4. The upper end face 2.3 is closed whereas the lower end face 2.4 is open, see FIG. 2, which shows a plan view of the lower end face 2.4.

The electrically conductive loop 1 now extends diagonally over the lower end face 2.4 for which this is crossed by a web 5 which extends in the diagonal direction from the front side 2.1 to the rear side 2.2. The side of the loop 1 running over the web 5 is the connection side 1.1 of the loop 1.

From its connection side 1.1 the loop 1 extends over both cylindrically curved surfaces between the front side 2.1 and the rear side 2.2 onto the upper end face 2.3. The side 1.2 of the loop 1 opposite the connection side 1.1 certainly lies in a plane which is plane-parallel to the plane of the connection side 1.1 but the opposite side 1.2 is twisted at an angle to the connection side 1.1 and specifically over the twist axis 9 which is perpendicular to the connection side 1.1 and perpendicular to the base surface of the printed circuit board 6 shown schematically in FIG. 1. Only the direction of the connection side 1.1 is indicated by a dot-dash line in FIG. 1.

As a result of the design of the shape of the loop 1 shown in FIG. 1 and described previously, the area 10 enclosed by the loop which is for the passage of electromagnetic waves which produce an interaction with an electric current flow through the loop 1, is twisted via the twist axis 9. In the exemplary embodiment shown the loop is composed of two straight lines on the connection side 1.1 and the opposite side 1.2 and two curves connecting the straight lines in order to achieve the desired twisting of the area 10.

In detail a of FIG. 1, the loop 1 and its position erected on the printed circuit board 6 is again shown schematically but without the twisting according to the invention of the area 10 enclosed by the loop 1 about the twist axis 9. Here it can also be seen again that the connection side 1.1 and the opposite side 1.2 of the loop 1 run in planes which are parallel to one another. Further shown schematically is an electronic component 7 on the printed circuit board 6 which is also shown by the dashed line in the main view of FIG. 1 and which for example forms a coupling loop 8 having a coupling side 8.1 via which signals are coupled into the loop 1 and/or coupled out from this, wherein the coupling side 8.1 in particular runs parallel to the connection side 1.1 of the loop 1. Instead of being integrated in the electronic component 7, however the coupling loop 8 could also be integrated in the printed circuit board 6 or be omitted in an embodiment without coupled loops. In the latter case, electrical connections would accordingly need to be provided on the connection side 1.1 of the loop 1.

The coupling loop 8 designed here as a closed loop, i.e. the coupling loop 8 encloses an area, could also be designed as an open elongated coupling loop which for example opens at one end in an earth connection or connection with predefined electrical voltage. Electrical components such as one or a plurality of capacitors, coils, or one or a plurality of electrical resistances or also other components could be provided in the coupling loop.

The distance between the coupling loop 8 or the coupling side 8.1 thereof and the connection side 1.1 of the loop 1 is in particular 0.2 to 0.7, in particular 0.4 to 0.6, advantageously 0.5 mm.

Figure 4:
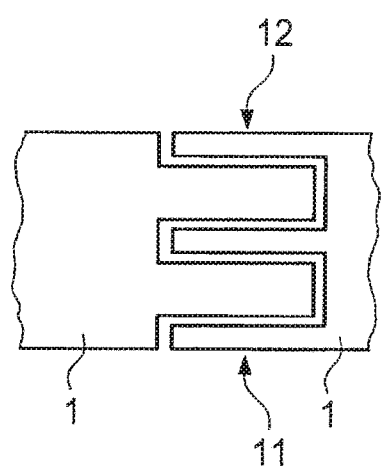
FIG. 4 shows an example of an interdigital capacitor formed by an interruption of the loop.

In the exemplary embodiment shown, the loop 1 has two interruptions 11 on the upper end face 2.3 of the base body 2, which can be bridged by electrical resistances and/or capacitors not shown in detail here in order to tune the loop 1 according to the case of application. An alternative to tuning is shown in FIG. 4 where the interruption 11 forms an interdigital capacitor 12. This means that the mutually facing free ends of the loop 1 have intermeshing fingers positioned at a distance from one another.

Figure 2:
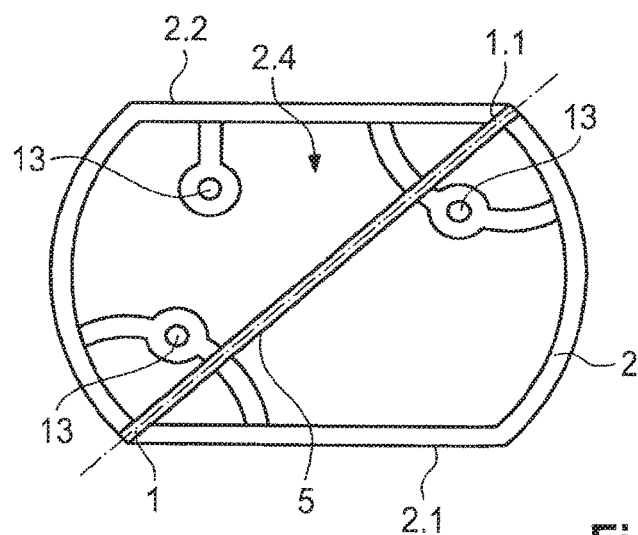
FIG. 2 shows the antenna from FIG. 1 viewed from below.

FIG. 2 further shows as an example connecting sockets 13 of the base body 2 which serve the purpose that the base body 2 can be fastened on the printed circuit board 6 or the electronic component 7, for example by screws engaging in the sockets 13.

Figure 3:
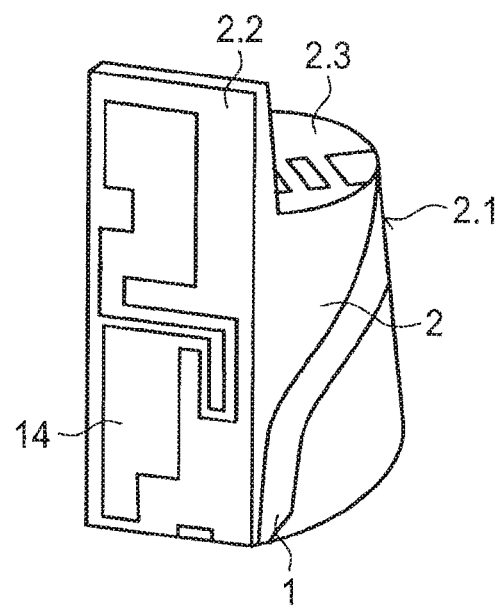
FIG. 3 shows the antenna from FIG. 1 viewed from behind.

FIG. 3 shows that the rear side 2.2 of the base body 2 is provided with an additional antenna 14. The additional antenna 14 has the form of a fractal antenna. The rear side 2.2 in the exemplary embodiment show is lengthened over the remaining region of the base body 2 in order to provide a larger area for the additional antenna 14. However, this is not absolutely necessary.

Both the loop 1 and the additional antenna 14 can for example be mounted by laser direct structuring on the surface of the base body 2. However, other methods of mounting are also possible.

As a result of the shape of the base body 2, which in particular is perpendicular to the printed circuit board 6, it is particularly easy to set up a loop 1 according to the invention on the printed circuit board 6. A cost-effective and stable embodiment is possible.

Figure 5:
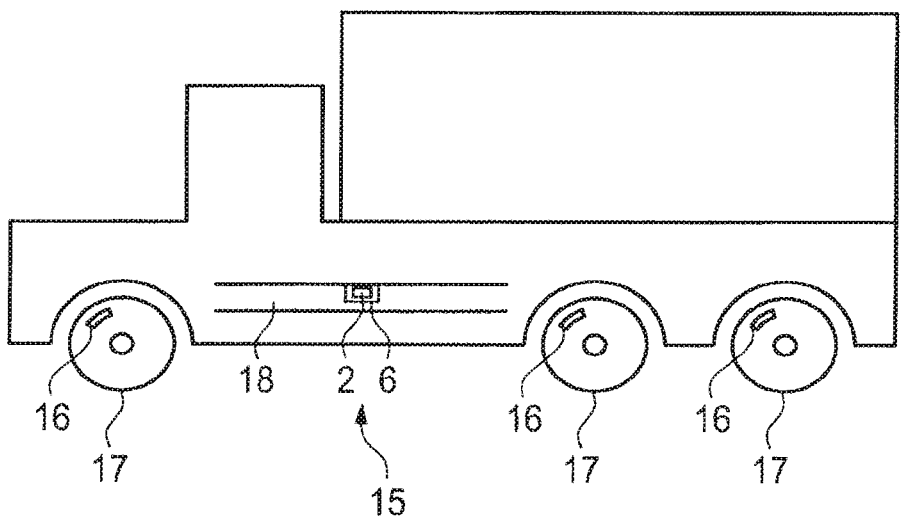
FIG. 5 shows a motor vehicle with a tyre status monitoring system according to the invention.

FIG. 5 shows as an example a motor vehicle in which a tyre status monitoring system according to the invention is integrated. The tyre status monitoring system comprises a receiving device 15 and a plurality of tyre status sensors 16 in different tyres 17. The receiving device 15 is mounted on a frame 18 of the vehicle which is made of metal. The printed circuit board 6 for example lies flat on the frame 18. However, since the base body 2 with the loop of the antenna according to the invention not shown here in detail is at an angle or perpendicular to the printed circuit board 6 and therefore the frame 15, wireless communication between the tyre status sensors 16 and the receiving device 15 is possible without further interference by the effect of the frame 18 on the electromagnetic waves.

The invention claimed is:

1. An antenna for a receiver or transmitter in a motor vehicle, comprising an electrically conductive loop which surrounds an area for passage of electromagnetic waves which interact with an electric current flow through the loop; wherein the loop has a connection side via which an electric current can be introduced into the loop or drawn from the loop inductively or by means of at least one electrical connection; wherein the loop is rotated about an axis perpendicular to or at an angle to the connection side and configured so that the area surrounded by the loop defines a three-dimensional shape; wherein the connection side of the loop is formed by a straight line, a singly or multiply angled line or a curve and the loop has a side opposite the connection side which is also formed by a straight line, a singly or multiply angled line or a curve, wherein the connection side and the opposite side run within two plane-parallel planes.

2. The antenna according to claim 1, wherein the antenna comprises an electrical printed circuit board to which the loop is connected electrically conductively or inductively with its connection side and the twist axis and the loop are perpendicular to or at an angle to a base surface of the printed circuit board.

3. The antenna according to claim 2, wherein the printed circuit board or an electronic component provided thereon forms an electrically conductive coupling loop which is inductively coupled to the loop and the connection side of the loop and a coupling side of the coupling loop assigned thereto run equidistantly, in particular parallel to one another.

4. The antenna according to claim 2, wherein the connection side of the loop is formed by a straight line, a singly or multiply angled line or a curve and the loop has a side opposite the connection side which is also formed by a straight line, a singly or multiply angled line or a curve, wherein the connection side and the opposite side run within two plane-parallel planes.

5. The antenna according to claim 2, wherein the antenna comprises a base body which in particular has an at least substantially cylindrical or frustroconical shape at least over a part of its circumference and the loop is mounted on the outer surface of the base body.

6. The antenna according to claim 1, wherein the antenna comprises a base body and a body circumference and the loop is mounted on the outer surface of the base body.

7. The antenna according to claim 6, wherein the base body comprises a hollow body, which encloses an interior, wherein the base body is open to the interior at least on one open side and the open side has a web running diagonally through the opening, which carries a section, of the loop.

8. The antenna according to claim 7, wherein the loop is interrupted over its circumference once or multiple times, in particular twice, in particular outside the connection side.

9. The antenna according to claim 6, wherein at least one additional antenna is mounted on the base body, which is electrically connected to the loop or electrically insulated from the loop.

10. The antenna according to claim 9, wherein the at least one additional antenna comprises a different form to the loop antenna.

11. The antenna according to claim 6, wherein the loop is mounted by laser direct structuring on the base body.

12. The antenna according to claim 6, wherein the loop is interrupted over its circumference once or multiple times, in particular twice, in particular outside the connection side.

13. The antenna according to claim 6, wherein the base body has an at least substantially cylindrical or frustroconical shape at least over a part of the body circumference.

14. The antenna according to claim 1, wherein the loop has at least one interruption outside the connection side.

15. The antenna according to claim 14, wherein the at least one interruption is bridged by at least one of an electrical resistance, an inductance and/or by a capacitor.

16. The antenna according to claim 15, wherein the at least one interruption forms an interdigital capacitor.

17. The antenna according to claim 15, wherein at least one additional antenna is mounted on the base body, which is electrically connected to the loop or electrically insulated from the loop.

18. The antenna according to claim 14, wherein the at least one interruption forms an interdigital capacitor.

19. A receiver, in particular of a tyre status monitoring system having an antenna according to claim 1.

20. A tyre status monitoring system having a receiver which has an antenna according to claim 1.

21. The tyre status monitoring system according to claim 20, further comprising a tyre status sensor in communication connection with the antenna and/or can be switched into communication connection with the antenna.

* * * * *